United States Patent
Fling

(10) Patent No.: US 7,212,131 B2
(45) Date of Patent: *May 1, 2007

(54) CONTROLLING AN UNDERGROUND OBJECT

(75) Inventor: Richard William Fling, Bristol (GB)

(73) Assignee: Radiodetection Limited, Bristol (GB)

(*) Notice: Subject to any disclaimer, the term of this patent is extended or adjusted under 35 U.S.C. 154(b) by 0 days.

This patent is subject to a terminal disclaimer.

(21) Appl. No.: 11/232,908

(22) Filed: Sep. 23, 2005

(65) Prior Publication Data

US 2006/0012490 A1  Jan. 19, 2006

Related U.S. Application Data

(63) Continuation of application No. 10/601,189, filed on Jun. 23, 2003, now Pat. No. 6,980,123, which is a continuation of application No. 09/504,833, filed on Feb. 16, 2000, now Pat. No. 6,606,032.

(30) Foreign Application Priority Data

Feb. 22, 1999 (GB) ................. 9904010.7

(51) Int. Cl.
G01V 3/00 (2006.01)
(52) U.S. Cl. .............. 340/853.3; 324/326; 175/45; 175/57; 73/152.03
(58) Field of Classification Search ........ 340/853.3, 340/853.8; 324/326; 175/57, 48, 38; 702/9; 73/152.03
See application file for complete search history.

(56) References Cited

U.S. PATENT DOCUMENTS

| 3,908,453 | A | 9/1975 | Jeter | ............... 73/151 |
| 4,345,650 | A | 8/1982 | Wesley | |
| 4,701,890 | A | 10/1987 | Ohmer et al. | ........... 367/25 |
| 4,763,258 | A | 8/1988 | Engelder | .......... 364/422 |
| 4,903,245 | A | 2/1990 | Close et al. | |
| 4,909,336 | A | 3/1990 | Brown et al. | |
| 5,103,919 | A | 4/1992 | Warren et al. | .......... 175/45 |
| 5,259,468 | A | 11/1993 | Warren et al. | |
| 5,318,129 | A | 6/1994 | Wittrisch | .......... 166/336 |
| 5,850,624 | A | 12/1998 | Gard et al. | |

(Continued)

FOREIGN PATENT DOCUMENTS

EP  0172599  1/1985

(Continued)

OTHER PUBLICATIONS

Search Report of Nov. 9, 1999.

(Continued)

Primary Examiner—Albert K. Wong
(74) Attorney, Agent, or Firm—Baker & Hostetler LLP

(57) ABSTRACT

In order to control the sonde of an underground object, such as an underground boring tool, a predetermined sequence of rotation steps is applied to the object and that sequence is detected. The detection of the appropriate sequence causes the sonde to change its function, for example by changing the carrier frequency of the signal transmitted by the sonde on to change the data output sequence or transfer rate, or to change output power. While it is possible to use a single rotation step, the use of more than one step, with each step to be carried out within a predetermined time, reduces the risk of error.

11 Claims, 4 Drawing Sheets

U.S. PATENT DOCUMENTS

| | | | | |
|---|---|---|---|---|
| 5,917,325 | A | 6/1999 | Smith | 324/326 |
| 6,237,404 | B1 * | 5/2001 | Crary et al. | 73/152.03 |
| 6,267,185 | B1 | 7/2001 | Mougel et al. | |
| 6,285,190 | B1 | 9/2001 | Brune et al. | 324/326 |
| 6,606,032 | B1 * | 8/2003 | Fling | 340/853.3 |
| 6,980,123 | B2 * | 12/2005 | Fling | 340/853.3 |
| 2002/0105331 | A1 | 8/2002 | Brune et al. | 324/326 |

FOREIGN PATENT DOCUMENTS

| | | |
|---|---|---|
| EP | 0588390 | 6/1993 |
| GB | 2356207 | 11/1999 |
| GB | 2352743 | 7/2000 |
| WO | 96/29615 | 9/1996 |

OTHER PUBLICATIONS

Search Report of Aug. 2, 2000.

* cited by examiner

CONTROLLING AN UNDERGROUND OBJECT

This application is a continuation of Ser. No. 10/601,189, filed Jun. 23, 2003, now U.S. Pat. No. 6,980,123, which is a continuation of Ser. No. 09/504,833, filed Feb. 16, 2000, now U.S. Pat. No. 6,606,032, which claims priority to United Kingdom Application No. 9904010.7, filed Feb. 22, 1999, the disclosures of which are incorporated herein by reference in their entirety.

BACKGROUND OF THE INVENTION

1. Field of the Invention

The present invention relates to the control of an underground object. It is particularly, but not exclusively, concerned with the control of a sonde forming part of an underground boring tool.

2. Summary of the Prior Art

It is well known that if an underground boring tool generates a magnetic field, that magnetic field can be detected above ground by a suitable locator. An example of this is described in e.g WO96/29615 in which a solenoid on or in the underground tool generates a magnetic field which is detected to measuring locations. It is also possible, by modulating the magnetic field, to transmit information from the underground boring tool to the locator. Therefore, it is possible to have a sonde in which such field generation, modulation, etc is controlled. The sonde then makes it possible to transmit information from the underground boring tool to the locator.

In particular, it is possible for the sonde to transmit data representing the orientation of the underground boring tool. In WO96/29615, the boring tool incorporated a tilt sensor, and the sonde could then transmit the data from that sensor to the locator. Other sensors, such as roll sensors, may also be provided.

In such arrangements, the sonde generated a low frequency electromagnetic field (typically 8 to 30 kHz), which carrier is modulated to transmit sensor data. Such communication is thus from the sonde to the locator, and there is no direct communication from the locator to the sonde.

Normally, the carrier signal generated by the sonde is at a predetermined frequency. The locator is then controlled to detect that carrier frequency, and the modulations thereon. However, signalling between the sonde and the locator may be affected by interference from underground sources of electromagnetic radiation such as electrical cables, or the magnetic field distortion effects of buried metallic structures. Such interference effects are frequency dependent, and therefore it is possible that transmission between the sonde and the locator at a particular frequency may be greatly affected by such interference, whereas transmission at another frequency may not be affected, or affected much less. Of course, changing the carrier frequency may also affect the range of transmission between the sonde and the locator, battery life, etc, and therefore there is potentially a balance between these factors. If the operator of the locator finds that interference is a problem, the operator may decide that operating at another carrier frequency would be beneficial. However, in the existing systems, it is not possible for the operator to signal to the sonde to change frequency.

It would, of course, be possible to provide a suitable signalling path from the locator to the sonde by increasing the complexity of both the locator and the sonde. This would increase the size and cost of the sonde, which may not be desirable or practical for an underground boring tool.

However, existing underground boring tools are normally connected to their drive in a way which permits the drive to rotate the boring tool. Many underground boring tools have an axially offset slanted face which enables the boring tool to be steered so that it moves in the desired direction at any time. In order to detect this rotation, sondes associated with such tools include a roll sensor, information from which can be transmitted to the locator. In normal circumstances, the information from the roll sensor is used by the operator to control the direction of movement of the boring tool.

SUMMARY OF THE INVENTION

However, it has been realised in accordance with the present invention that if a predetermined rotation or rotation sequence is applied to the underground boring tool, a roll sensor can detect such rotation and the rotation may be treated as a command for the sonde. Thus, if the operator wants to signal to the sonde to change carrier frequency, a predetermined rotation or sequence of rotations is applied to the underground or inaccessible boring tool, detected by the roll sensor of the sonde, which sonde then determines the frequency change needed.

Although the present invention has been formulated with particular application to an underground boring tool, it is applicable to an control of an underground or inaccessible object in which a predetermined rotation or sequence of rotations is applied to that object, which rotations are treated as commands to signalling operations from the underground object.

Where there is a single rotation, the present invention may provide that a change in carrier frequency of a sonde in the underground boring tool may be triggered by a rotation which is different from that needed to trigger a change of the sonde to a state in which it does not generate electromagnetic radiation (a "park" state). Alternatively, if the sonde does not have such a park state, the change in frequency may be triggered by a single rotation.

It should be noted that the present invention is not limited to the case where the command triggers a change in carrier frequency but includes arrangements in which the command triggers other changes in functions of the sonde.

Preferably, a sequence of rotations is used to transmit a command, each rotation of which must be completed within pre-set time limits. The sequence is then chosen so that it will not occur during the normal operation of the boring tool. The use of a time limit for each rotation in the sequence of rotations significantly reduce the probability of the detection of a command during normal activities of the underground boring tool.

The present invention thus permits signalling to the sonde in an underground boring tool without modification to the boring tool or significant alteration of the features or the physical size of the sonde. In addition to altering the carrier frequency of the sonde, other features of operation, such as data output sequence, data transfer rate, or carrier output power may be controlled by signalling using the present invention.

BRIEF DESCRIPTION OF THE DRAWINGS

An embodiment of the present invention will now be described in detail, by way of example, with reference to the accompanying drawings, in which.

DETAILED DESCRIPTION

Figure 1:
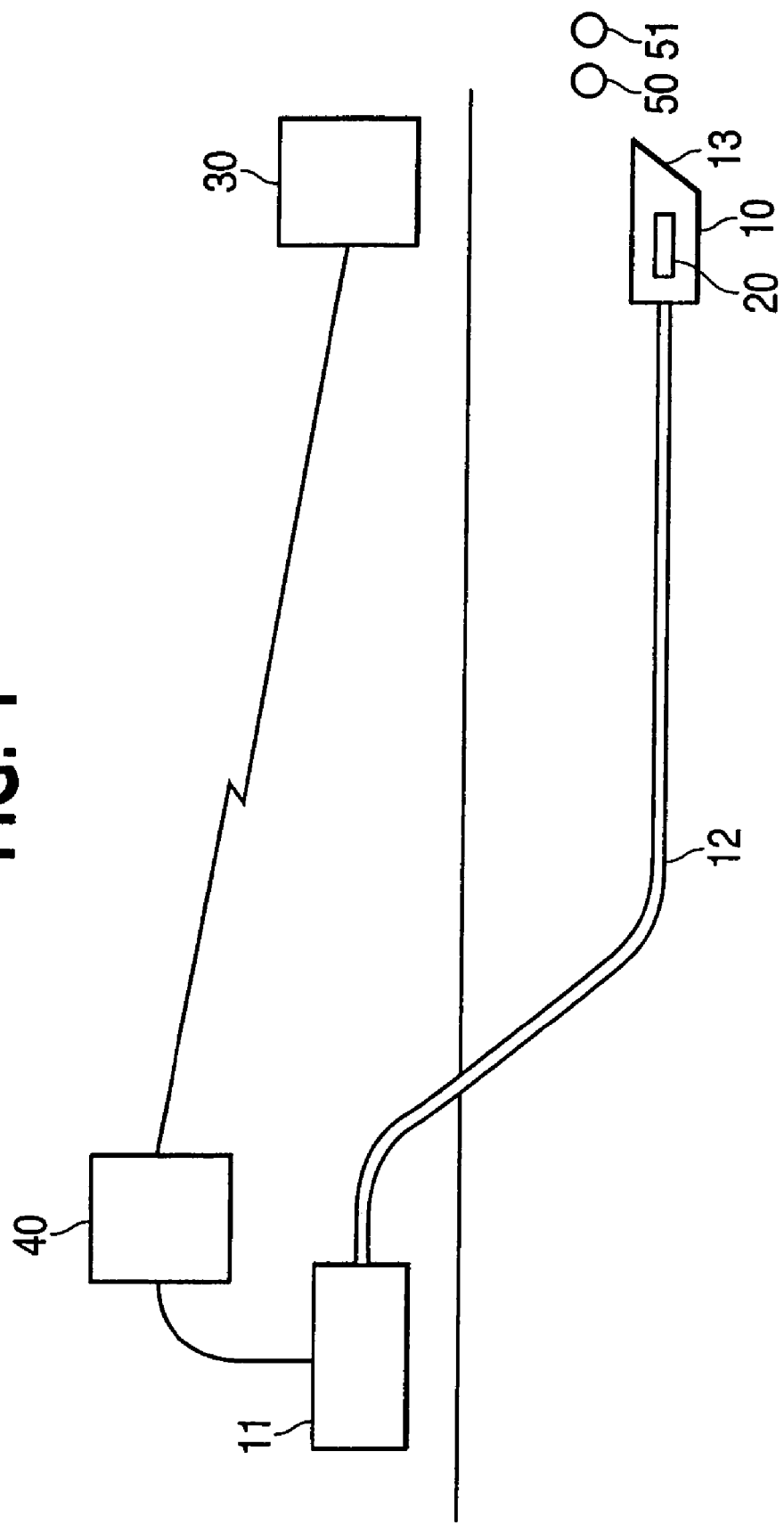
FIG. 1 is a schematic block diagram of an embodiment of the present invention.

Referring first to FIG. 1, an underground boring tool 10 is driven from a drive means 11 via a drive shaft 12. The drive means is arranged to move the boring tool 10 forward, but also to impart rotations to the boring tool 10. The boring tool 10 has a slanted leading face 13, and thus the orientation of the boring tool 10 affects the direction in which it will move.

The boring tool 10 contains a sonde 20, which incorporates a roll sensor which can detect the axial orientation of the boring tool 10. The sonde also includes means for generating a magnetic field, which generating means is controllable so that the magnetic field has a carrier frequency and a modulation means, thus the frequency may be modulated to transmit data from the sonde 20. That magnetic field is detected by a suitable locator 30. That locator 30 has means for signalling to a remote station 40, which remote station is connected to the drive means 11. It is thus possible for the operator of the locator 30 to control the movement of the underground boring tool 10 from the location of the locator, by signalling to the remote station 40, which then controls the drive means to drive the underground boring tool 10 in a suitable direction.

The sonde 20 is normally battery-driven and therefore to extend the total number of hours the sonde 20 underground, it may have a power saving mode for times in which the sonde 20 is not required to transmit data. This is known as the "park" mode. In that park mode, the sonde turns off the electromagnetic transmission, and also any other circuits of the sonde 20 which are not used. In order to initiate the park mode, the boring tool 10 is rotated through a predetermined roll angle, which can be detected by the tilt sensor of the sonde 20. When the roll sensor detects that such a rotation has occurred, and there has been no subsequent rotation for a suitable period such as 2 or 3 minutes, the sonde enters the park mode. When the sonde detects that predetermined rotation, it may trigger a display on the remote station 40 to indicate to the operator that it has received the command to change to the park mode after the predetermined delay, so that the operator can initiate another rotation if the park mode is not needed. The park mode is cancelled immediately a further rotation of the underground boring tool is detected by the sonde 20.

Figure 2:
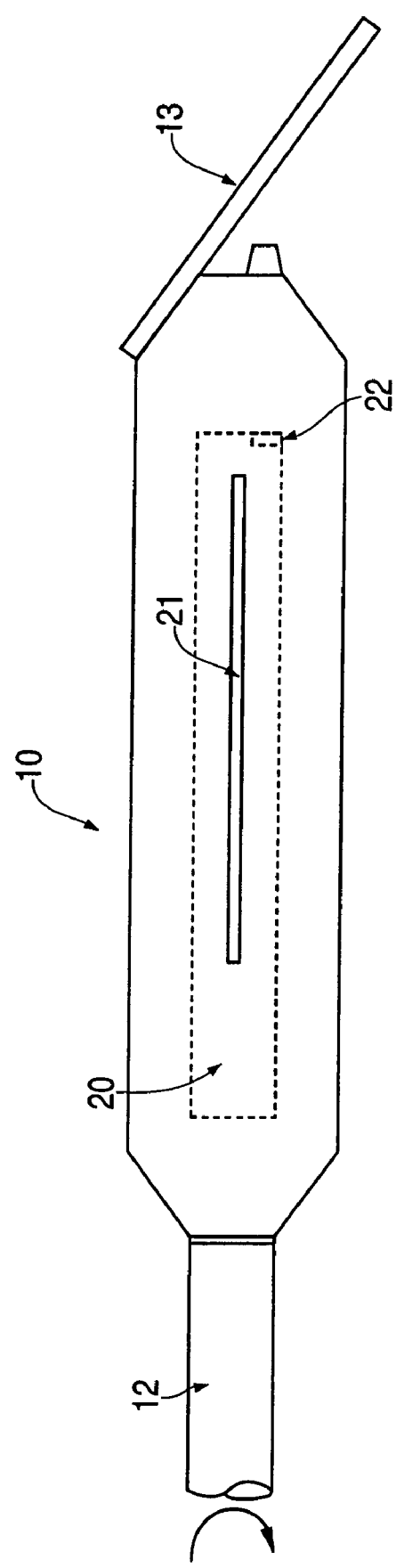
FIG. 2 shows the underground boring tool of FIG. 1 in more detail.

FIG. 2 shows the underground boring tool 10 in more detail. The slanted leading face 13 is more clearly shown, and FIG. 2 also shows that the boring tool 10 has a slot 21 therein to aid the radiation of electromagnetic signals from the sonde 20. The sonde 20 is rotationally keyed to the rest of the boring tool 10 by a key 22.

In accordance with the present invention, the underground boring tool is rotated through a predetermined angle a plurality of times. That predetermined angle may be the same as that needed to initiate the park mode, but this is not a problem provided the time interval between successive rotations is less than that needed to trigger the park mode itself.

If there are n steps in the sequence, the number of possible commands to the sonde 20, in addition to the park command, is n−1. If the angle of successive rotations in the sequence is different from that needed to trigger the park mode, there would then be n possible commands, but it is convenient for the angles to be the same.

In such an arrangement, each rotation in the sequence must be completed within a suitable time, such as 60 s otherwise the command will not be recognised. This use of a time limit for each step to be completed significantly reduces the probability of a command being identified during normal activities of the underground boring tool 10.

The ability to send commands to the sonde 20 by rotating the boring tool 10 in a suitable sequence of rotations permits an operator to change the operation of the sonde. For example, signalling between the sonde 20 and the locator 30 may be affected by conductors such as utility lines and pipes 50, 51 underground adjacent the boring tool 10. The interference generated is often frequency dependent, and therefore a change in carrier frequency may reduce the interference of the signalling. Therefore, if the operator using the locator 30 finds that there is interference, e.g because particular signals from the sonde 20 are not detected, a signal may be generated via the remote station 40 to the drive means 11 to generate a command by rotation of the underground boring tool which causes the sonde 20 to change its carrier frequency. The operator may then determine if the interference is reduced, and then the sonde 20 continues to operate at that new frequency. If there is still interference, the operator may again trigger the sonde 20 to change frequency by causing another command to be transmitted to the sonde 20 by rotation of the boring tool 10. Other commands may change data output sequence, data transfer rate, or the output power of the carrier signal.

Figure 3:
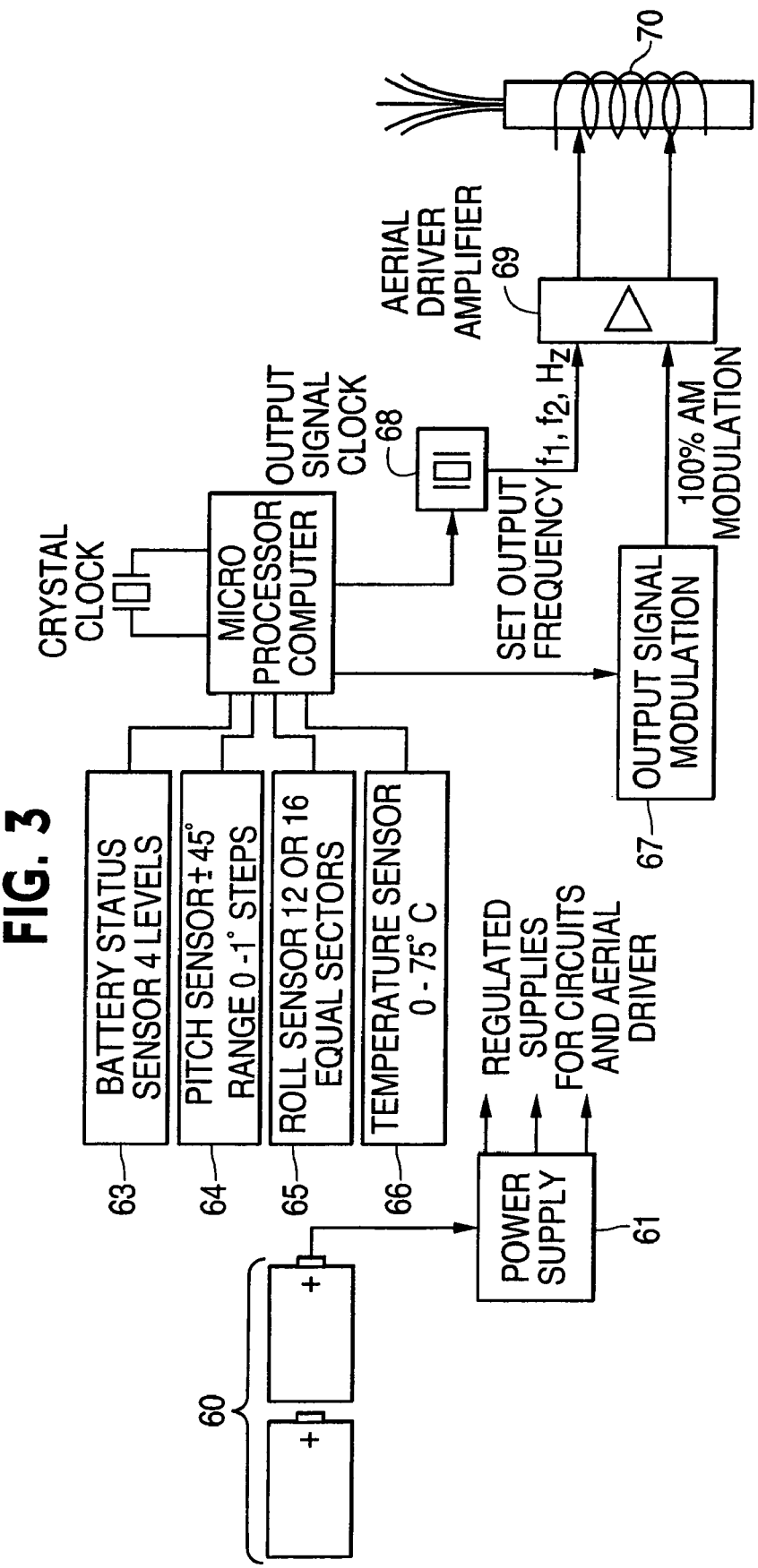
FIG. 3 is a block circuit diagram of the sonde of the boring tool of FIG. 2.

FIG. 3 shows the electrical structure of the sonde 20 in more detail. The sonde 20 is powered by a battery pack 60, which provides the input to a power supply module 61 which outputs regulated supplies for the circuits of the sonde 20. The control of the sonde 20 is by a microprocessor 62 which receives inputs from a battery sensor 63, a pitch sensor 64, a roll sensor 65 and a temperature sensor 66. The processor receives data representing the outputs of the sensor 63 to 66 and generates two outputs. One output controls a modulation unit 67 which encodes the data which the sonde 20 is to transmit, and the second output from the microprocessor 62 controls an output signal clock 68 which generates a carrier signal which is modulated by the output from the modulation unit 67 in an amplifier 69. The signal from the microprocessor 62 to the output signal clock 68 determines the frequency or frequencies which that clock outputs to the amplifier 69. The amplifier 69 then controls a solenoid 70 to generate electromagnetic signals in which the carrier signal from the output clock 68 is modulated by the output from the modulation unit 67.

In this embodiment, it is preferable for the sensors to operate step wise and thus, as shown in FIG. 3, the battery sensor has four output levels, the pitch sensor determines the pitch plus or minus 45° in steps of 0.1°, and the roll sensor determines rotations in 12 or 16 equal sectors. Thus, the roll sensor permits a sequence of rotations to be detected, in order to send commands to the sonde 20 by rotating the boring tool 10 in a suitable sequence of rotations. If such a sequence of rotations generates a command which is identified by the microprocessor 62 as one involving change of the output frequency, a suitable change is applied to the output clock 68.

Figure 4:
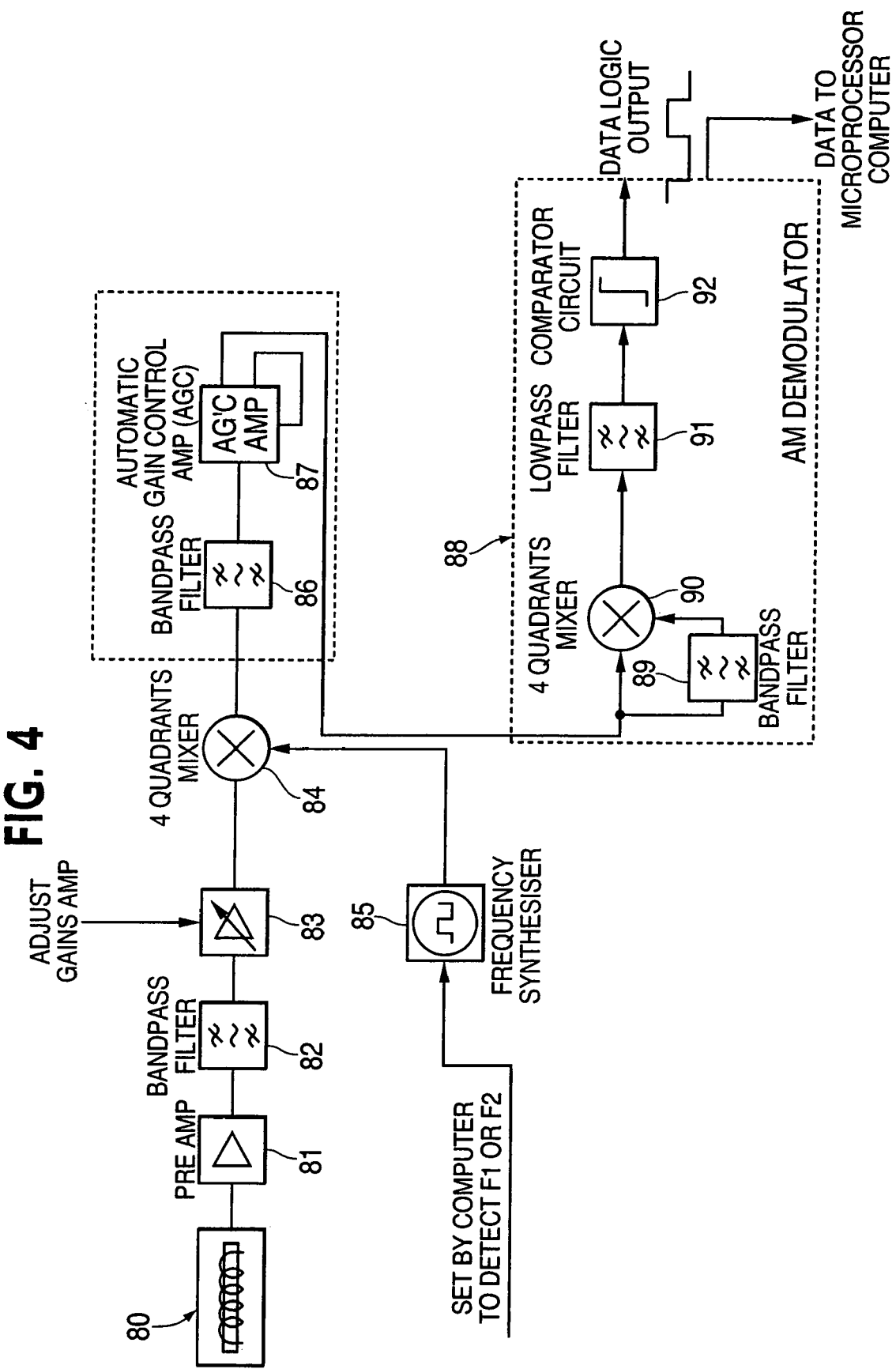
FIG. 4 is a block circuit diagram of the locator of the embodiment of FIG. 1.

FIG. 4 then shows in more detail a possible structure for the locator 30. The locator has a detection coil 80, the output of which is passed via a pre-amplifier 81, a band pass filter 82, and an adjustable gain amplifier 83 to a mixer 84. The mixer 84 also receives an input from a frequency synthesiser 85, the frequency of which is selected by a suitable input from the remote station 40 in a way which corresponds to the frequency of the carrier signal from the sonde 20. Additionally, when the sonde frequency is changed, the locator frequency synthesiser 85 is also changed under control of the operator/computer so that the data can be received at the new frequency. The output of the mixer 84 is then passed via a band pass filter 86 and an automatic gain control amplifier 87 to a demodulator 88. The demodulator 88 receives the signal from the automatic gain control amplifier 87 and passes it directly, and via a band pass filter 89, to a mixer 90, the output of which passes via a low pass filter 91 and a comparator 92, to output data representing the data applied as a modulation to the carrier signal from the sonde 20. That data output may then be passed back to the remote station 40.

What is claimed is:

1. A method of operating an underground or inaccessible object, said object including a sonde arranged to emit signals having a plurality of non-orientation-dependent characteristics, said method comprising the steps of:
    applying a predetermined rotation sequence involving at least one rotation step to said object;
    detecting, said rotation sequence;
wherein said detection of said rotation sequence causes said sonde to change from the emission of a hint signal having a first non-orientation-dependent characteristic to the emission of a second signal having a second nonorientation-dependent characteristic.

2. A method according to claim 1 wherein said first non-orientation-dependent characteristic and said second non-orientation-dependent characteristic of said signal are a first carrier frequency and a second carrier frequency respectively.

3. A method according to claim 1 wherein said first non-orientation-dependent characteristic and said second non-orientation-dependent characteristic of said signal are a first data output sequence and a second data output sequence respectively.

4. A method according to claim 1 wherein said first non-orientation-dependent characteristic and said second non-orientation-dependent characteristic of said signal are a first data transfer rate and a second data transfer rate respectively.

5. A method according to claim 1 wherein said first non-orientation-dependent characteristic and said second non-orientation-dependent characteristic of said signal are a first output power and a second output power respectively.

6. A method according to claim 1 wherein said rotation sequence comprises a plurality of steps is completed within a predetermined time limit.

7. Apparatus for operating an underground or inaccessible object, said apparatus including:
    a sonde for emitting a plurality of signals having predetermined non-orientation-dependent characteristics of the underground or inaccessible object;
    rotation means for applying a predetermined rotation sequence involving at least one rotation step to said object;
    detection means for detecting said predetermined rotation sequence; and
    response means activated by said detection of said predetermined rotation sequence for causing said sonde to change from the emission of a first signal having a first non-orientation-dependent characteristic to the emission of a second signal being a second non-orientation dependent characteristic.

8. Apparatus according to claim 7 wherein said object is an underground boring tool and said detection means is a roll sensor.

9. A method of operating an underground or inaccessible object including a sonde, said object being connected to an operator triggered drive means, said method comprising the steps of:
    signaling from said drive means to said sonde, said
    signaling including the operator triggering said
    operator triggered drive means to apply a predetermined rotational sequence involving at least one rotation step to said object;
    detecting said rotation sequence, wherein said detection of said rotation sequence causes said sonde to change from a first signal modulation to a second signal modulation.

10. A method according claim 9 wherein said rotation sequence-comprises a plurality of rotation steps.

11. A method according to claim 10 wherein each rotation of said plurality of steps is completed within a predetermined time limit.

* * * * *